United States Patent [19]

Bevington

[11] Patent Number: 5,779,358
[45] Date of Patent: Jul. 14, 1998

[54] BLENDER HAVING A DISCONNECTABLE BASE PORTION

[75] Inventor: Dale Bevington, London, England

[73] Assignee: Dualit Limited, London, England

[21] Appl. No.: 814,334

[22] Filed: Mar. 11, 1997

[30] Foreign Application Priority Data

Mar. 12, 1996 [GB] United Kingdom ............... 9605236

[51] Int. Cl.⁶ ........................... B01F 13/04; B02C 23/04
[52] U.S. Cl. ..................................... 366/206; 241/37.5
[58] Field of Search ................ 366/96–98, 197, 366/199, 205, 206, 314, 601; 99/348; 241/199.2, 199.12, 277, 282.1, 282.2, 37.5

[56] References Cited

U.S. PATENT DOCUMENTS

| 3,612,126 | 10/1971 | Emmons et al. ............ 366/205 X |
| 4,269,519 | 5/1981 | Birr ........................... 241/37.5 X |
| 5,323,973 | 6/1994 | Ferrara, Jr. ................ 366/205 X |
| 5,353,697 | 10/1994 | Venturati et al. ............ 366/314 X |
| 5,567,049 | 10/1996 | Beaudet et al. ........... 241/37.5 X |

FOREIGN PATENT DOCUMENTS

| 841629 | 4/1952 | Germany ................... 241/37.5 |
| 762213 | 11/1956 | United Kingdom ............ 366/205 |
| 2 134 804 | 1/1983 | United Kingdom . |

*Primary Examiner*—Charles E. Cooley
*Attorney, Agent, or Firm*—Lahive & Cockfield, LLP; Anthony A. Laurentano

[57] ABSTRACT

A blender (13) comprises a base support (12) having a motor (14), a container (22) formed in two connectable and disconnectable portions (23, 26), a first of the portions being a base portion (23) mounting a number of rotatable blades (30) and being connectable to the base support so that the blades will be driven by the motor (14), and the other portion comprising an upper open tubular portion (26), the blender including a motor disable switch (17) arranged to automatically disable the motor unless the base portion and upper portion are fully engaged with each other and the base support. A switch operating member, in the form of a collar (41) and plunger (20), provides effective connection between the upper tubular portion (26) of the container and the switch, such that it will move the switch to its operative position when the upper portion and base portion are full engaged with each other and the base support.

6 Claims, 1 Drawing Sheet

5,779,358

BLENDER HAVING A DISCONNECTABLE BASE PORTION

BACKGROUND OF THE INVENTION

This invention relates to an electric blender, normally for use in the kitchen. Such blenders are well known and comprise a support base including a drive motor for rotating a number of blades about a vertical axis, together with a container, often in the form of a jug, in which the blades are located, and for holding the material to be blended.

In most existing models of blenders the blades are mounted permanently in the jug on a shaft which is arranged to be engaged with and driven by a drive shaft connected to the motor which the container and support base are connected as a push-fit. Because the container is conventionally fairly deep and the blades are located near the base of the container, there is little danger of the rotating blades accidently contacting the fingers, hair or clothing of a user.

The present invention is concerned with a container for a blender in which the blades are not permanently located in the container but in which the blades are located on a separate base portion of the container which can be disconnected from a tubular upper portion of the container, that upper portion being open but closable by a lid. Such a container is already known in which a separate base portion and a tubular upper portion screw together. Because the upper portion unscrews from the base portion, the blades can remain connected to the motor unscreened or protected by the upper jug portion. Such an arrangement is dangerous.

PRIOR ART

GB Specification 2134804 discloses a jug having a disconnectable top which includes blades and which, with the jug inverted, can be connected to a base portion containing a motor. The jug handle includes a projection which can, in one position only of the jug on the base, allow the motor to be activated.

SUMMARY OF THE INVENTION

An object of the present invention is to provide a blender which is safe and which can be connected to the base to operate in any relative angular orientation about the vertical axis.

Accordingly the present invention provides a blender comprising a base support having a motor, a container formed in two connectable and disconnectable portions, a first of the portions being a base portion mounting a number of blades rotatable about an axis and being connectable to the base support so that the blades will be driven by the motor, and the other portion comprising an upper tubular portion, the blender including motor disabling means arranged to automatically disable the motor unless the base portion and upper portion are fully engaged with each other and the base support, and means on the container for deactivating the disabling means when the base portion and upper portion are fully engaged with each other and the base support in any relative angular orientation about the axis.

Preferably the motor disabling means comprising a switch biased to a position in which it acts to disable the motor but movable to a deactivated position in which it allows the motor to operate, and a switch deactivating member effectively connected to the upper tubular portion of the container such that it will move the switch to its operative position only when the upper portion and base portion are fully engaged with each other and the base support.

The switch operating member is preferably an annular collar shaped to surround and engage with an outwardly and upwardly tapering part of the exterior of the tubular upper container portion, so that downward movement of the upper container portion into said engaged condition will move the collar downwardly, the collar having a portion arranged to engage with a plunger which acts on the switch.

The plunger is preferably arranged in a hollow in the base support upper surface, which hollow is too small to allow entry of a child's finger, for example it has a width of less than 6 mm and preferably less than 4 mm.

The switch is preferably a microswitch arranged in the power supply line to the motor.

BRIEF DESCRIPTION OF THE DRAWINGS

One embodiment of blender, in accordance with the invention, will now be described, by way of example only, with reference to the accompanying diagrammatic drawings of which.

DETAILED DESCRIPTION OF ONE EMBODIMENT

Figure 1:
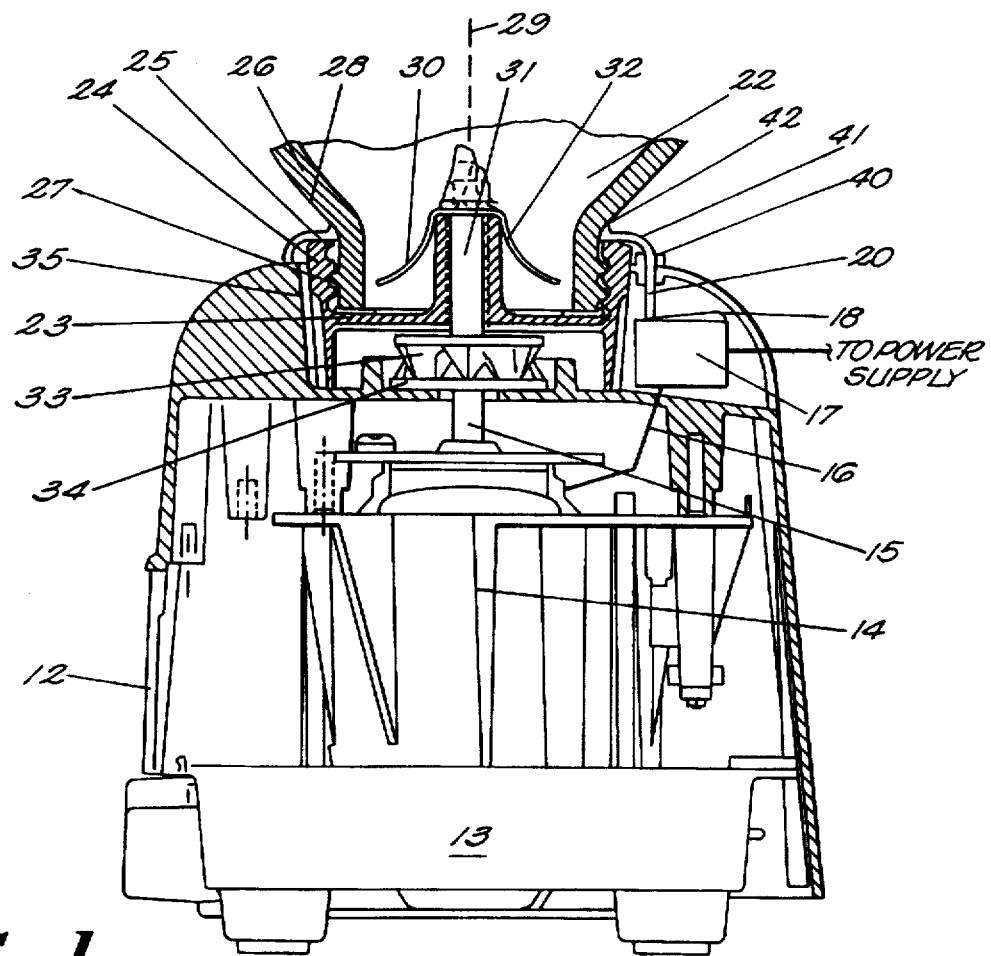
FIG. 1 is a vertical section through the engaging parts of a base support and container of a blender.
Figure 2:
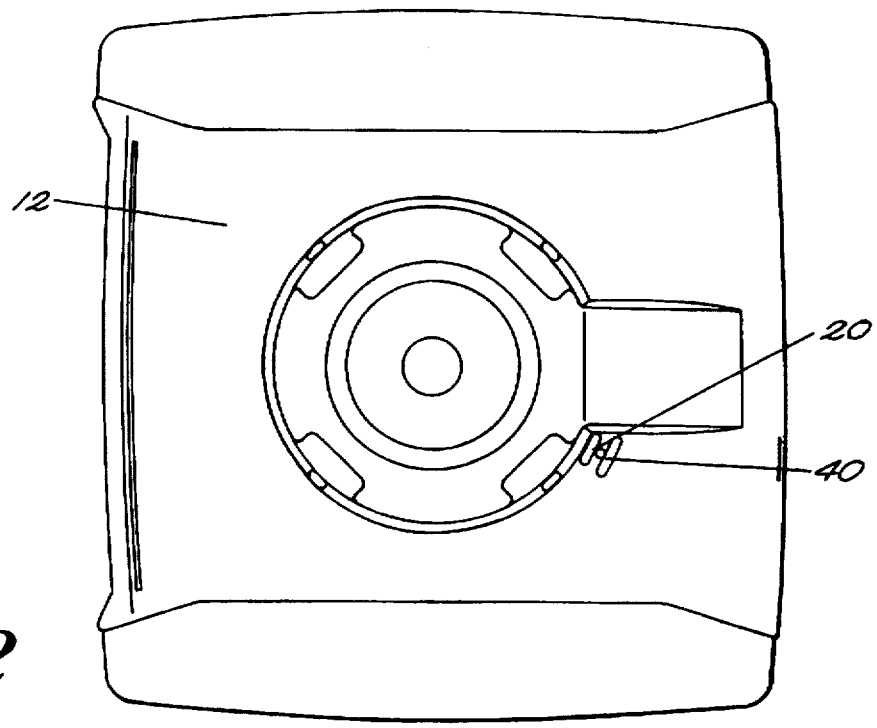
FIG. 2 is a plan view of the base support of the blender of FIG. 1.

A base support casting 12 of an electrically driven blender 13 had a motor 14 having an upwardly projecting drive shaft 15. The motor is arranged to be supplied with power via a power supply line, indicating diagrammatically at 16, in which is located a microswitch 17. The microswitch has an arm 18 spring biased to an open inoperative position in which is disables the motor, but movable by depression of a plunger 20 to a closed deactivated position shown in which it allows connection of the power supply to the motor. The blender will normally include an on/off switch, operable by the user but not shown.

The blender also includes a open topped container 22, closable by a lid, and formed in two connectable and disconnectable portions; a lower base portion 23 is formed with an upwardly projecting collar 24 having an internal thread 25, and an upper tubular portion 26, only the lower section of which is shown. The lower section of the upper portion has a cylindrical part with an external thread 27 engageable with the thread 25 so that when the parts are screwed fully together they form a leak-proof container. The upper container portion also has an upwardly and outwardly flared lower part 28.

The base portion has permanently mounted therein a number of blades 30 connected to a shaft 31 for rotation about a vertical axis 29 in a bearing 32 in the base portion. A toothed part 33 at the base of the shaft 31 is arranged to engage with a similar toothed part 34 at the upper end of the motor drive shaft 15.

The lower portion of the container is a push-fit in a hollow 35 in the upper surface of the base support 12. The upper surface of the base support 12, at a location above the microswitch 17, defines a groove 40 which has a width too small for entry of a child's finger, in this case the maximum width is 3 mm. A plunger 20 extends into the base of this groove. A plastics material annular collar 41 has a downwardly projecting portion which is arranged to rest on the upper surface of the base support and extend into the groove 40. The collar 41 has an upwardly and outwardly tapered inner surface 42 which is arranged to closely engage the upwardly and outwardly tapered outer surface of the part 28 of the upper portion of the container. The collar is symmetrical and the arrangement allows the jug to be inserted into the base in any relative angular position about the vertical axis. The arrangement is such that only when the base portion of the container is fully engaged with the base support casting and the upper portion of the container is fully engaged with the base portion of the container, will the collar 41 be pushed downwardly sufficiently to depress the plunger 20 and move the microswitch to its closed position in which the motor is operative. With this arrangement neither the blades 30 nor the drive 34 can be driven unless they are protected by the upper container portion.

What is claimed is:

1. A blender, comprising a base support having a motor, a container formed in two connectable and disconnectable portions, a first of the portions being a base portion mounting a number of blades rotatable about an axis and being connectable to the base support so that the blades are driven by the motor, and the other portion being an upper tubular portion, a switch biased to a position in which it is arranged to automatically disable the motor unless the base portion and upper tubular portion are fully engaged with each other and the base support but movable to a deactivated position in which it allows the motor to operate, and a substantially annular collar arranged for engagement by the upper tubular portion for moving the switch to the deactivated position when the base portion and upper tubular potion are fully engaged with each other and with the base support in any relative angular orientation about the axis.

2. A blender according to claim 1 in which the collar is loosely supported in a groove formed in the base support.

3. A blender according to claim 2 in which the upper tubular portion of the container has an outwardly and upwardly tapered exterior part, and wherein the collar is shaped to surround and engage said exterior part.

4. A blender according to claim 1 in which the upper tubular portion of the container has an outwardly and upwardly tapered exterior part, and wherein the collar is shaped to surround and engage said exterior part.

5. A blender according to claim 1 in which downward movement of the upper tubular portion into the condition fully engaged with the base portion is arranged to move the collar downwardly, the collar having a portion arranged to engage with a plunger which acts on the switch.

6. A blender according to claim 1 including a movable part located between the collar and the switch to act on the switch to enable the motor in the deactivated position, the switch being configured to be inaccessible to a child's finger when the container is displaced from the base support.

* * * * *